United States Patent [19]
Crewson

[11] Patent Number: 6,059,074
[45] Date of Patent: May 9, 2000

[54] GAUGE FOR SLACK ADJUSTER

[76] Inventor: Gary E. Crewson, 49 Silent Meadow La., Orchard Park, N.Y. 14127

[21] Appl. No.: 09/005,915

[22] Filed: Jan. 12, 1998

Related U.S. Application Data

[63] Continuation-in-part of application No. 08/700,844, Aug. 21, 1996, Pat. No. 5,762,165.

[51] Int. Cl.[7] ........................................ F16D 66/02
[52] U.S. Cl. ............................... 188/1.11 W; 188/1.11 R
[58] Field of Search ...................... 188/1.11 W, 1.11 L, 188/1.11 R, 1.11 F

[56] References Cited

U.S. PATENT DOCUMENTS

| | | | |
|---|---|---|---|
| 3,356,188 | 12/1967 | Goldman et al. | 188/79.5 |
| 4,136,634 | 1/1979 | Wilson | 188/1 A |
| 4,776,438 | 10/1988 | Schandelmeier | 303/1.11 W |
| 5,181,440 | 1/1993 | Jagt | 303/1.11 W |
| 5,320,198 | 6/1994 | Hoyt et al. | 188/1.11 |
| 5,350,043 | 9/1994 | Crewson et al. | 188/79.55 |
| 5,358,076 | 10/1994 | Lucas | 188/1.11 |
| 5,441,128 | 8/1995 | Hoyt | 188/1.11 |
| 5,535,854 | 7/1996 | Prince | 188/1.11 |

*Primary Examiner*—Matthew C. Graham
*Attorney, Agent, or Firm*—Simpson, Simpson & Snyder, L.L.P.

[57] ABSTRACT

A gauge for visually indicating travel of a brake operating rod having one end pivotally connected to a slack adjuster including a plate bearing indicia, which is mounted for movement with the one end of the brake operating rod, and a pointer pivotally supported on the slack adjuster and arranged to point to the indicia, wherein the pointer is coupled to the plate to cause the pointer to pivot relative to the adjuster and swing relative to the indicia, during travel of the brake operating rod.

6 Claims, 2 Drawing Sheets

GAUGE FOR SLACK ADJUSTER

This application is a Continuation-In-Part of commonly assigned U.S. patent application Ser. No. 08/700,844, filed Aug. 21, 1996 now U.S. Pat. No. 5,762,165.

BACKGROUND OF THE INVENTION

It is known to provide a gauge for a slack adjuster, which includes a pointer mounted for movement with an end of a brake operating rod pivotally connected to a housing of the slack adjuster, and indicia applied to the housing, wherein the pointer swings across the indicia incident to pivotal movement of the brake operating rod relative to the housing for purposes of indicating the extent of travel of the brake operating rod relative to a brake release position. For example, reference may be made to U.S. Pat. Nos. 5,320,198 and 5,441,128.

SUMMARY OF THE INVENTION

The present invention relates to gauges for slack adjusters, and more particularly, to a gauge for a slack adjuster including an indicia bearing plate mounted for movement with a brake operating rod and a pointer pivotally supported by a housing of the slack adjuster to which the brake operating rod is connected, wherein the pointer is coupled to the indicia bearing plate to effect pivotal movement of the pointer relative to the housing and swinging movement of the pointer relative to the indicia for purposes of indicating the extent of movement of the brake operating rod relative to a brake release position.

In a preferred construction, the pointer is coupled to the indicia bearing plate by projection carried by the plate and a slot opening formed in the pointer and sized to slidably and rotatably receive the projection.

Further, the preferred gauge construction is disclosed for use with an automatic slack adjuster of the general type disclosed in commonly assigned U.S. Pat. No. 5,350,043, wherein an indicia bearing plate and pointer are shaped and mounted so as to permit the alternative mounting thereof adjacent opposite sides of the housing of the slack adjuster.

The present construction allows for substantial magnification of the size of the indicia provided with the gauge in order to facilitate observation thereof by persons charged with checking of the condition of a vehicle's brakes with which the gauge is installed.

BRIEF DESCRIPTION OF THE DRAWINGS

The nature and mode of operation of the present invention will now be more fully described in the following detailed description taken with the accompanying drawings wherein.

DETAILED DESCRIPTION

Figure 1:
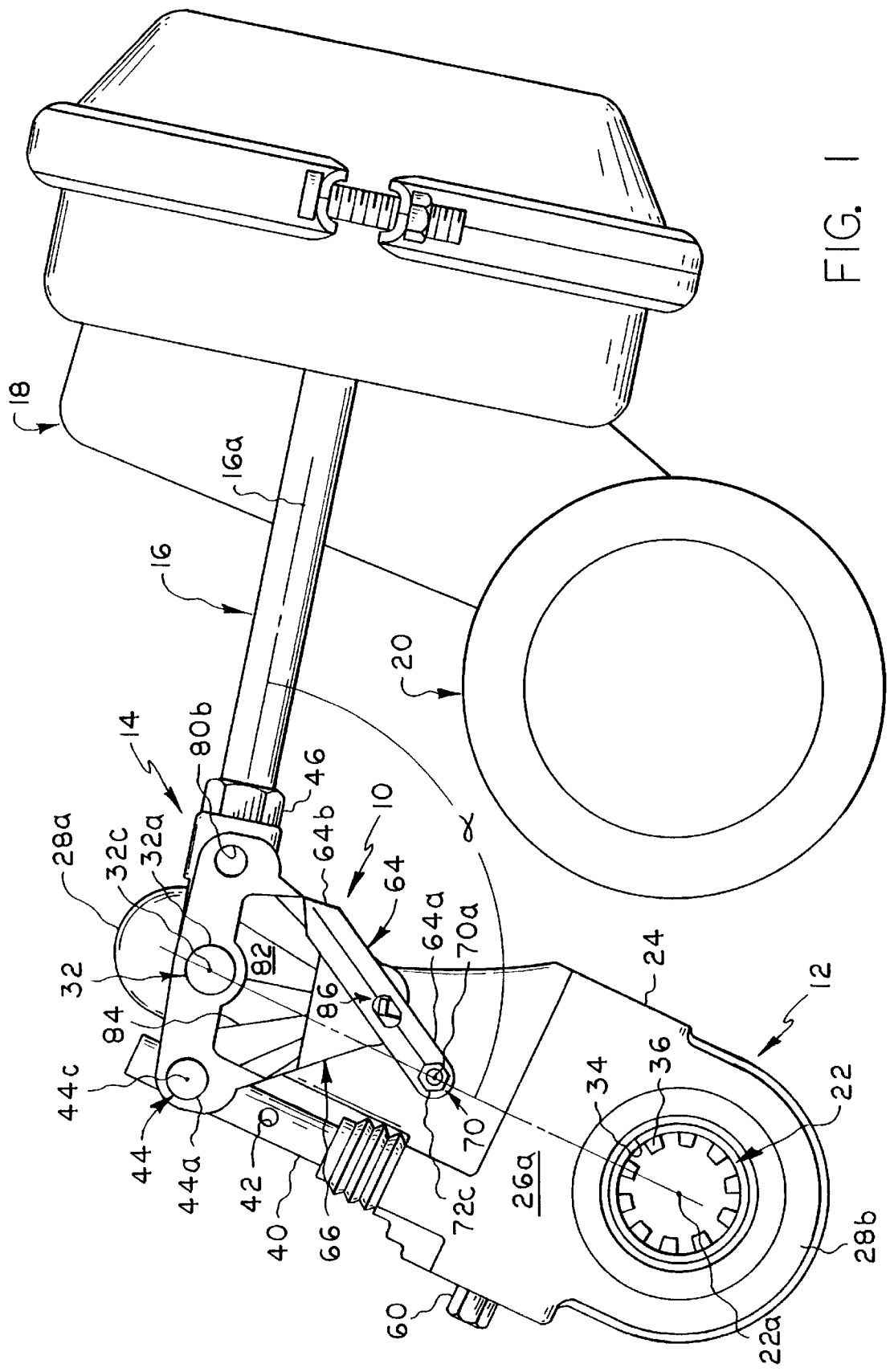
FIG. 1 is a side elevational view of a vehicle brake operating apparatus showing the gauge of the present invention arranged to show a brake release position of a brake operating rod.

Reference is first made to FIG. 1 wherein a gauge formed in accordance with a presently preferred form of the invention is generally designated as 10 and shown for example in association with an automatic slack adjuster 12 adjustably coupled via a connector 14 to an operating rod or push rod 16 extending from an air chamber or air operated cylinder 18 mounted on a trailer axle 20. Slack adjuster 12 is in turn operably connected to brakes, not shown, of the trailer by a rotatably supported brake operating or cam shaft 22.

Slack adjuster 12 is shown, for example, in FIGS. 1–4 as being of the type disclosed in U.S. Pat. No. 5,350,043, wherein the adjuster generally includes a housing 24 having opposite sides, only one of which is shown at 26a, extending between first and second ends 28a and 28b. First end 28a is formed with a bore opening 30 extending between to the opposite sides of housing 24 and sized to removably, slidably receive a first pivot pin 32, and second end 28b is formed with an opening 34 extending between the opposite sides of the housing and sized to receive a worm gear 36 which is keyed for rotation with shaft 22. Housing 24 additionally serves to slidably mount a control link 40 whose free upper end is formed with a plurality of bore openings 42 sized to removably, slidably receive a second pivot pin 44.

Typically, connector 14 is in the form of a clevis, which is adjustably, threadably mounted on a free end of operating rod 16 and locked in adjusted position thereon by a nut 46. The legs 48a and 48b of the clevis are formed with a first pair of aligned openings 50a and 50b for slidably receiving first pivot pin 32 and a second pair of aligned openings 52a and 52b for slidably receiving second pivot pin 44. Pivot pins 32 and 44 are normally retained in mounted position relative to housing 24, the clevis 14 and control link 40 by forming same with enlarged head end portions 32a and 44a and with opposite through bored end portions 32b and 44b adapted to removably receive retaining pins 54 and 56 when pivot pins 32 and 44 are mounted, their pivot axes 32c and 44c are parallel.

It will be understood that slack adjuster 12 is preferably initially installed with the aid of a mounting gauge of the type described in U.S. Pat. No. 5,131,163 to arrange a line drawn through the centers of openings 30 and 34 of housing 24 to assume a desired angular relationship relative to the axis 16a of operating rod 16 when the operating rod is disposed in a retracted, brake release position relative to air chamber 18, as generally depicted in FIG. 1. Upon the depression of a brake pedal, not shown, air introduced into chamber 18 serves to extend or affect brake operating movement of operating rod 16 to the left, as viewed in FIG. 1, whereby to swing housing 24 about the axis 22a of shaft 22 into a brake operating position shown for example in FIG. 2, whereby to affect rotation of such shaft for brake operating purposes. Upon release of the brake pedal, operating rod 16 is returned to its initial or brake release position and shaft 22 caused to undergo counter-rotation to affect release of the vehicle brakes.

Figure 2:
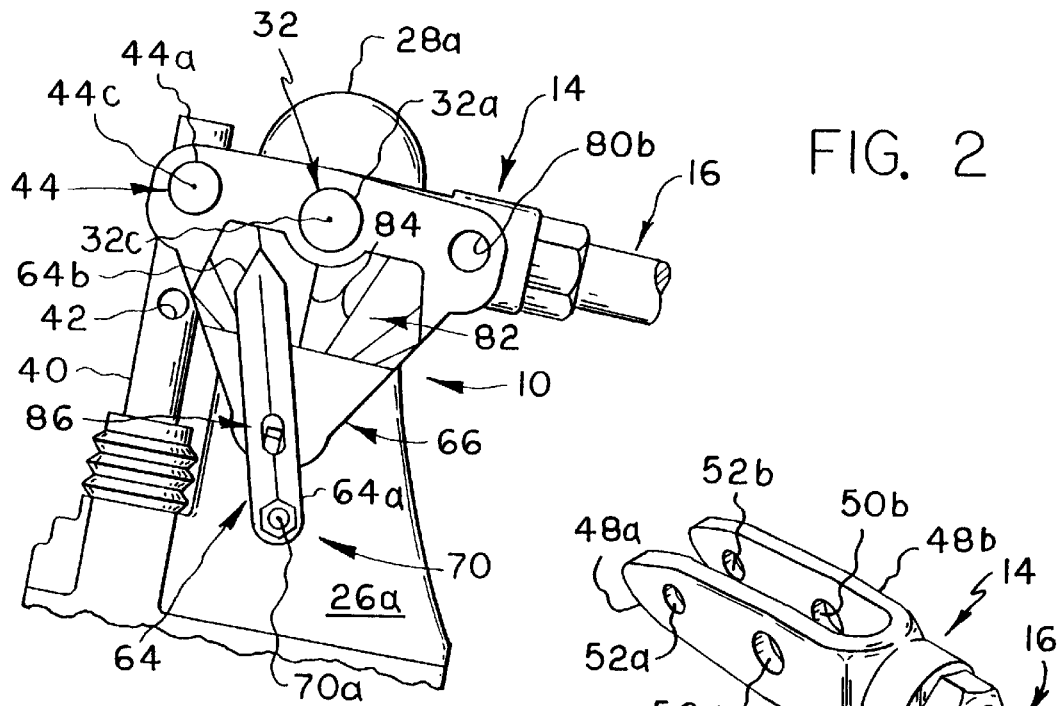
FIG. 2 is a fragmentary view with the gauge showing an extent of travel of the brake operating rod incident to application of the brakes of a vehicle.

In an automatic slack adjuster of the type described in above-referenced U.S. Pat. No. 5,350,043, any adjustment of the angular orientation of housing 24 relative to shaft 22 required to accommodate for wear of the vehicle brakes, is affected at the conclusion of a brake operational cycle. In another type of known automatic slack adjuster, adjustment is affected at the initiation of a brake operational cycle. In manual type slack adjusters, a workman is required to effect periodical manual adjustments of the angular orientation of housing 24 relative to shaft 22, as by rotations of nut 60, in order to affect adjustment of vehicle brakes to compensate for wearing away thereof. In these various types of brake adjusters, upwards of a predetermined or given extent of movement of operating rod 16 away from brake release position is required to affect operation of properly adjusted brakes. The extent of required movement will be determined by the size or type of air chamber 18 used with a particular vehicle. For any given size or type of air chamber, extension or movement of operating rod 16 beyond the position shown for example in FIG. 2 is undesirable, since this will result in a gradual loss of braking capability resulting from excessive wear. Thus, it is desirable to provide means whereby it is possible to visually determine whether a brake adjuster is properly arranged in a desired brake release position, when the vehicle brake pedal is released, and whether the range of movement of operating rod 16 remains within a desired limit, when the vehicle brake pedal is depressed.

In accordance with the present invention, gauge 10 is employed to provide a visual indication of the brake release position of operator rod 16 and the extent of travel of such operator rod incident to application of a vehicle's brakes. A presently preferred form of gauge 10 is shown in FIGS. 1–3 for use in association with an automatic slack adjuster 12 and as comprising in combination a pointer 64 mounted on housing 24 and an indicia bearing plate 66 mounted for movement with operator rod 16 and movably coupled to pointer 64 in a manner providing for a visual indication of travel of the operator rod relative to its brake release position.

Pointer 64 is shown in the drawings as being elongated and having a mounting end 64a formed with a bore opening 68 and a pointed second end 64b intended to overlie plate 66. Bore opening 68 is intended to rotatably receive a suitable support bearing 70 for use in pivotally supporting pointer 64 on housing 24 for movement about an axis 70a arranged parallel to first axis 32c.

Figure 3:
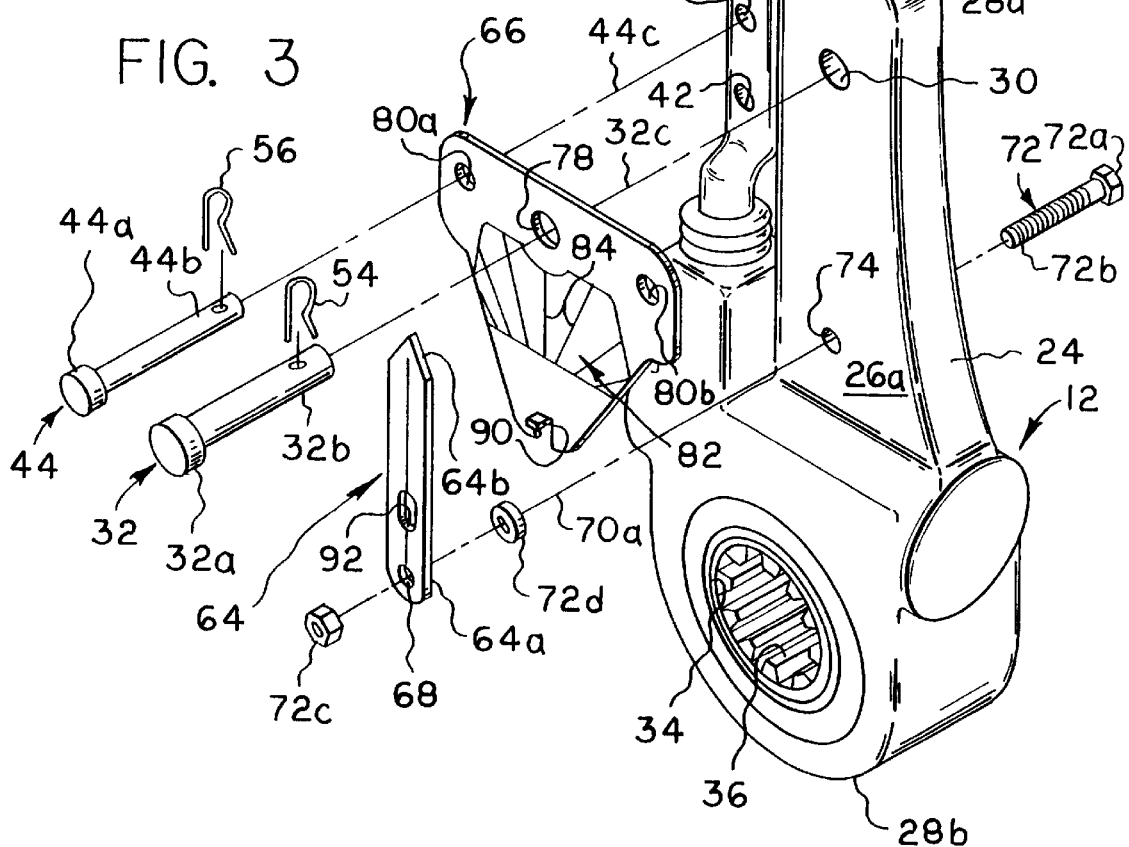
FIG. 3 is an exploded prospective view of the gauge of the present invention.

Support bearing 70 is shown for example in FIG. 3 as including a bolt 72 having an enlarged head end portion 72a and a shaft portion 72b, which is sized to be rotatably and slidably received within a bore opening 74 extending through the opposite sides of housing 26 and bore opening 68 of pointer 64. Bore opening 74 is arranged parallel to housing openings 30 and 34; and a nut 72c and spacer ring 72d are employed to removably retain pointer 64 on shaft portion 72b for rotation relative to housing 24 about axis 70a. Pointer 64 is shown as being mounted adjacent housing side 26a, but same may be readily mounted adjacent an opposite side of housing 26 by reversing the illustrated position of bolt 72, such that its head end position 72a is disposed adjacent housing side 26a. If desired, bore opening 74, bolt 72, nut 72c and ring 72d may be replaced by a threaded opening and a threaded bolt removably threaded selectively into opposite ends of such threaded opening. Thus, it will be understood that the illustrated support bearing 70 may be replaced by any suitable bearing, which presumably allows pointer 64 to be selectively alternatively mounted adjacent the opposite sides of housing 26 for pivotal movement about axis 70a.

Plate 66 is best shown in FIG. 3 as being formed with a first bore opening 78 sized to slidably receive first pivot pin 32 and a pair of second bore openings 80a and 80b spaced equally from and on opposite sides of the first bore opening and sized to slidably receive second pivot pin 44, and as baring centrally located indicia 82 shown for example as being in the form of a plurality of annularly spaced indicia lines 84 radiating from the pivot axis 70a of pointer 64. With this arrangement, the insertion of first pivot pin 32 within first bore opening 74 and housing bore opening 30, and second pivot pin 44 within second bore opening 80a and one of link bore openings 42 serves to arrange the plate adjacent housing side 26a with indicia lines 84 facing away from such housing side. On the other hand, when pivot pin 32 is inserted into first bore opening 78 and housing bore opening 30 from an opposite direction, and second pivot pin 44 inserted into second bore opening 80b and one of link bore openings 42 from an opposite direction, plate 66 may be arranged adjacent an opposite side of housing 24 with indicia lines 84 facing away from such opposite side.

Pointer 64 and plate 66 are movably coupled by a suitable coupling device 86, such that when plate 66 undergoes pivotal movement relative to housing 26 about the axis of first pin 32 incident to travel of operating rod 16, pointer 64 is forced to pivot relative to the housing about axis 70a in order to cause pointed second end 64b to swing relative to the plate and sweep across indicia 82 to indicate the position or extent of travel of the operating rod. Coupling device 86 may include for example, a projection 90 formed integrally with plate 66, and a guide opening in the form of an elongated 92 formed in pointer 64 and sized to slidably and pivotally receive such projection. These parts can of course be reversed, if desired, or replaced by any other suitable coupling device, such as for example, a generally U-shaped strap, not shown, carried by plate 66 and adapted to cooperate with the plate to define a guide opening sized to slidably and pivotally receive pointer 64.

What is claimed is:

1. A gauge for visually indicating travel of a brake operating rod having one end pivotally connected to a housing of a slack adjuster, said gauge comprising:

a plate bearing indicia and being mounted for movement with said one end of said brake rod; and a pointer pivotally supported by said housing and having an end arranged to point to said indicia, and said pointer is movably coupled to said plate to cause said pointer to pivot relative to said housing and said end of said pointer to swing relative to said indicia during travel of said brake rod.

2. A gauge according to claim 1, wherein said pointer is coupled to said plate by a projection and projection receiving guide opening associated with said plate and pointer, respectively.

3. In an automatic slack adjuster for vehicle brakes having an elongated housing provided with oppositely facing sides extending between first and second ends of said housing, a first opening extending between said sides adjacent said first end for receiving a pivot pin by which a connector carried adjacent a free end of a brake operating rod is pivotally connected to said first end for relative movement about a first axis and with a second opening extending between said sides adjacent said second end for receiving a shaft adapted to operate said brakes, said housing slidably supporting a link extending lengthwise thereof and having a free end for receiving a second pivot pin for connecting said free end to said connector, and said first and second pivot pins are parallel, said operating rod having a brake release position and being movable therefrom for effecting rotation of said shaft to operate said brakes, the improvement including means for providing a visual indication of movement of said operating rod relative to said brake release position, said means comprising in combination:

a pointer;

means for supporting said pointer adjacent one of said sides for pivotal movement about an axis disposed parallel to said first axis;

a plate formed with a first bore opening for pivotally receiving said first pivot pin and a second bore opening for pivotally receiving said second pivot pin, said plate bearing indicia, said first and second pivot pins supporting said plate adjacent one of said sides for movement with said operating rod relative to said housing and to arrange said indicia for cooperation with said pointer to indicate movement of said operating rod; and means for coupling said pointer to said plate for causing said pointer to pivot relative to said housing and move relative to said indicia during movement of said operating rod relative to said brake release position.

4. An improvement according to claim 3, wherein said means for coupling said pointer to said plate includes a guide opening defined by one of said pointer and said plate and a projection defined by the other of said pointer and said plate and sized to be movably received by said guide opening.

5. In an automatic slack adjuster for vehicle brakes having an elongated housing provided with oppositely facing sides extending between first and second ends of said housing, a first opening extending between said sides adjacent said first end for receiving a pivot pin by which a connector carried adjacent a free end of a brake operating rod is pivotally connected to said first end for relative movement about a first axis and with a second opening extending between said sides adjacent said second end for receiving a shaft adapted to operate said brakes, said housing slidably supporting a link extending lengthwise thereof and having a free end for receiving a second pivot pin for connecting said free end to said connector, and said first and second pivot pins are parallel, said operating rod having a brake release position and being movable therefrom for effecting rotation of said shaft to operate said brakes, the improvement including means for providing a visual indication of movement of said operating rod relative to said brake release position, said means comprising in combination:

a pointer;

means for removably supporting said pointer alternatively adjacent each of said sides for pivotal movement about an axis disposed parallel to said first axis;

a plate formed with a first bore opening for removably slidably receiving said first pivot pin and a pair of second bore openings uniformly spaced from said first bore opening and adapted to alternatively receive said second pivot pin, said plate bearing indicia, said first and second bore openings cooperating with said first and second pivot pins to alternatively support said plate adjacent one of said sides with said indicia arranged for cooperation with said pointer to indicate movement of said operating rod; and means for coupling said pointer to said plate for causing said pointer to pivot relative to said housing and move relative to said indicia during movement of said operating rod relative to said brake release position.

6. An improvement according to claim 5, wherein said means for coupling said pointer to said plate includes a guide opening defined by one of said pointer and said plate and a projection defined by the other of said pointer and said plate and sized to be movably received by said guide opening.

* * * * *